United States Patent
Cusmariu

(10) Patent No.: US 6,519,362 B1
(45) Date of Patent: Feb. 11, 2003

(54) METHOD OF EXTRACTING TEXT PRESENT IN A COLOR IMAGE

(75) Inventor: Adolf Cusmariu, Ellicott City, MD (US)

(73) Assignee: The United States of America as represented by the National Security Agency, Washington, DC (US)

( * ) Notice: Subject to any disclaimer, the term of this patent is extended or adjusted under 35 U.S.C. 154(b) by 0 days.

(21) Appl. No.: 09/503,887
(22) Filed: Feb. 15, 2000
(51) Int. Cl.$^7$ ................................................. G06K 9/34
(52) U.S. Cl. ..................... 382/176; 382/164; 358/464
(58) Field of Search ............................. 382/164, 162, 382/167, 176, 173, 274; 358/462, 464

(56) References Cited

U.S. PATENT DOCUMENTS

| | | | |
|---|---|---|---|
| 5,802,203 A | 9/1998 | Black et al. | 382/176 |
| 5,956,468 A | 9/1999 | Ancin | 382/164 |

Primary Examiner—Jon Chang
Assistant Examiner—Colin LaRose
(74) Attorney, Agent, or Firm—Robert D. Morelli

(57) ABSTRACT

The present invention is a method of extracting text from a color image by receiving a color image made up of pixels in any color component system, converting the color image to a grayscale image by performing one to five conversion methods, comparing the grayscale images to a user-definable threshold, and turning the grayscale images into binary images that may be further processed by an optical character reader or a search engine.

16 Claims, 1 Drawing Sheet

---

RECEIVING A COLOR IMAGE — 1

CONVERTING THE COLOR IMAGE TO A GRAYSCALE IMAGE USING ONE OR MORE OF THE FOLLOWING CONVERSION METHODS:

$$C1_{ij} = (R_{ij} + G_{ij})/2;$$

$$C2_{ij} = min(R_{ij}, G_{ij}, B_{ij}) / avg(R_{ij}, G_{ij}, B_{ij});$$

$$C3_{ij} = min(R_{ij}, G_{ij}, B_{ij}) / max(R_{ij}, G_{ij}, B_{ij});$$

$$C4n_{ij} = one(R_{ij}, G_{ij}, B_{ij}) / another(R_{ij}, G_{ij}, B_{ij}); \text{ and}$$

$$C5n_{ij} = sumcomb(R_{ij}, G_{ij}, B_{ij}) / sum(R_{ij}, G_{ij}, B_{ij})$$

2

COMPARING THE RESULTS OF THE LAST STEP TO A USER-DEFINABLE THRESHOLD AND SETTING THE VALUES OF THE COLOR COMPONENTS OF THE GRAYSCALE PIXELS TO EITHER A FIRST VALUE OR A SECOND VALUE

3

METHOD OF EXTRACTING TEXT PRESENT IN A COLOR IMAGE

FIELD OF THE INVENTION

The present invention relates, in general, to image analysis and, in particular, to segmenting individual characters or words.

BACKGROUND OF THE INVENTION

Extracting text from a color image, especially from a color image where the text is integrated with a graphic, is useful for optical character recognition and for conducting a text search. In the present invention, text integrated with a graphic means that the text and the graphic are not located in separate regions of the image but are combined somehow (e.g., overlaid). Color images that integrate text and graphics communicate in an immediate and effective manner and are widely used. However, such images are often a complex mixture of shapes and colors arranged in unpredictable ways which make it difficult to automatically extract or separate the text from the rest of the color image.

Systematic attempts to understand notions of color go back at least to Newton's light experiments with prisms in the 17th century, and have been considerably formalized and expanded since, most notably by Huygens, Young, von Helmholtz, and Maxwell. Numerically, the notion of color has largely been reduced to a wavelength measurement of an electromagnetic light wave. In addition, the structure of color receptors in the human eye has motivated the choice of three colors, namely red, green, an d blue (RGB), from which most other colors may be obtained by suitable weighted combinations. In 1931, the International Commission on Illumination (CIE) standardized the wavelengths of these three colors as: Red=700 nm, Green=546.1 nm, and Blue=435.8 nm, where 1 nm=$10^{-9}$ m. The fundamental RGB system is still prevalent today, used for color monitors, color scanners, video cameras, and digital file formats such as TIFF, JPEG, and BMP.

Mathematically, the RGB system may be thought of as a basis, from which other color coordinate systems may be derived via linear or non-linear transformations, depending on the particular application at hand. The general intention has been to define color specifications in standard, well-accepted terminology, resulting in reproducible results across many media. Some examples of color coordinate systems derived via linear transformations of RGB are the Luminance (usually called grayscale), In-phase chrominance, and Quadrature chrominance (YIQ), a system used for TV signals in the United States; the Cyan, Magenta, Yellow (CMY) subtractive system used in color printing; and several XYZ Cartesian systems defined by the CIE. Some non-linear examples include the Luminance, a-chrominance, and b-chrominance (Lab) system; the Luminance, u-chrominance, and v-chrominance (Luv) system; and the Hue, Saturation, and Brightness (HSB) system and its variants: hue, saturation, and value (HSV); hue, saturation, and intensity (HSI); and hue, lightness, and saturation (HLS).

In the digital domain (where image components are doubly-indexed pixel matrices with integer entries) a typical 24-bit RGB image is an overlay of three eight-bit images; thus each pixel component (e.g., R in RGB) ranges in value from 0 to 255, and is represented by an eight-bit binary number. The value of a pixel's color component represents the intensity of that color component. Therefore, a color component may be assigned one of 256 values when represented by an eight-bit binary number. A color component value of zero means that none of that color component contributes to the color of the pixel. For example, if R in RGB has a value of 0 then no red color is present in the pixel.

A digital color image may be easily converted from one color coordinate system to another. As a linear example, an image in RGB may be converted to an image in YIQ by converting each pixel in the RGB image to a pixel in YIQ as follows:

$$Y_{ij}=0.299R_{ij}+0.587G_{ij}+0.114B_{ij},$$

where $Y_{ij}$ is the ij pixel entry of the resulting Luminance channel, and $R_{ij}$ is the ij pixel value of the red component, $G_{ij}$ is the ij pixel value of the green component, and $B_{ij}$ is the ij pixel value of the blue component; similarly, $$I_{ij}=0.596R_{ij}-0.274G_{ij}-0.322B_{ij}$$

$$Q_{ij}=0.211R_{ij}-0.523G_{ij}+0.312B_{ij}$$

for the in-phase and quadrature chrominance components $I_{ij}$ and $Q_{ij}$.

Conversion from RGB to Lab provides an example of a non-linear coordinate transformation. It is given as $$L_{ij}=10(G_{ij})^{1/2},$$

$$a_{ij}=(R_{ij}-G_{ij})/(R_{ij}+2G_{ij}+B_{ij}), \text{ and}$$

$$b_{ij}=0.4(G_{ij}-B_{ij})/(R_{ij}+2G_{ij}+B_{ij}).$$

U.S. Pat. No. 5,802,203, entitled "IMAGE SEGMENTATION USING ROBUST MIXTURE MODELS," discloses a method of modeling an image, which may include text, as a compilation of layers having different brightness functions to prevent corruption of the image due to noise or to compress the image. The method of U.S. Pat. No. 5,802,203 does not extract text from a color image that includes graphics as does the present invention. U.S. Pat. No. 5,802,203 is hereby incorporated by reference into the specification of the present invention.

U.S. Pat. No. 5,956,468, entitled "DOCUMENT SEGMENTATION SYSTEM," discloses a method of identifying those regions in a document that contain an image and regions that contain text so that dithering techniques for printing may be used only on images. U.S. Pat. No. 5,956,468 requires an image to be separate from text. Therefore, U.S. Pat. No. 5,956,468 cannot extract text that is an integral part of an image as does the present invention. U.S. Pat. No. 5,956,468 is hereby incorporated by reference into the specification of the present invention.

SUMMARY OF THE INVENTION

It is an object of the present invention to extract text from a color image.

It is another object of the present invention to extract text from a color image, where the text is integrated with a graphic.

The present invention is a method of extracting text from a color image in three steps: image reception, grayscale conversion, and binarization.

The first step is receiving a color image, where the image includes pixels, where each pixel is represented by a color component system selected from the color component systems consisting of RGB, YIQ, CMY, XYZ, Lab, Luv, HSB, HSV, HSI, and HLS.

The second step is converting the color image received into a grayscale image in a manner that maximizes the contrast between any text in the image and the rest of the image. It is this second step that is crucial to the text extraction process. Five different conversion methods (i.e., C1, C2, C3, C4n, and C5n) are used to generate one or more grayscale images. C1, C2, and C3 each generate one grayscale image while C4n and C5n each generate six grayscale images if a pixel is made up of three color components. To avoid division by zero, the corresponding value of the color component of the received image is biased upward by one. The five conversion methods apply pixel-wise as follows:

$$C1_{ij} = avg(R_{ij}, G_{ij}) = (R_{ij} + G_{ij})/2;$$

$$C2_{ij} = min(R_{ij}, G_{ij}, B_{ij})/avg(R_{ij}, G_{ij}, B_{ij});$$

$$C3_{ij} = min(R_{ij}, G_{ij}, B_{ij})/max(R_{ij}, G_{ij}, B_{ij}); \text{ and}$$

$$C4n_{ij} = one(R_{ij}, G_{ij}, B_{ij})/another(R_{ij}, G_{ij}, B_{ij}); \text{ and}$$

$$C5n_{ij} = comb(R_{ij}, G_{ij}, B_{ij})/sum(R_{ij}, G_{ij}, B_{ij}).$$

The third step of the method is comparing each pixel value in each grayscale image resulting from the second step to a threshold T and setting the value of the grayscale pixel to a first value (e.g., 0) if the value of grayscale pixel is not greater than T; otherwise, setting the value of the grayscale pixel to a second value (e.g., 1). The third step results in the binarization of the grayscale images resulting from the second step. The threshold is defined by the following equation:

$$T = min(Cm_{ij}) + k*std(Cm_{ij}), \text{ or alternatively as}$$

$$T = max(Cm_{ij}) - k*std(Cm_{ij}),$$

where * denotes multiplication, and where m=1, 2, 3, 4n, and 5n., The result of the third step is a set of black and white images where any text in the color image received appears as either black text against a white background or white text against a black background. The result of the third step may be processed further by an optical character reader or a search engine.

DETAILED DESCRIPTION

Figure 1:
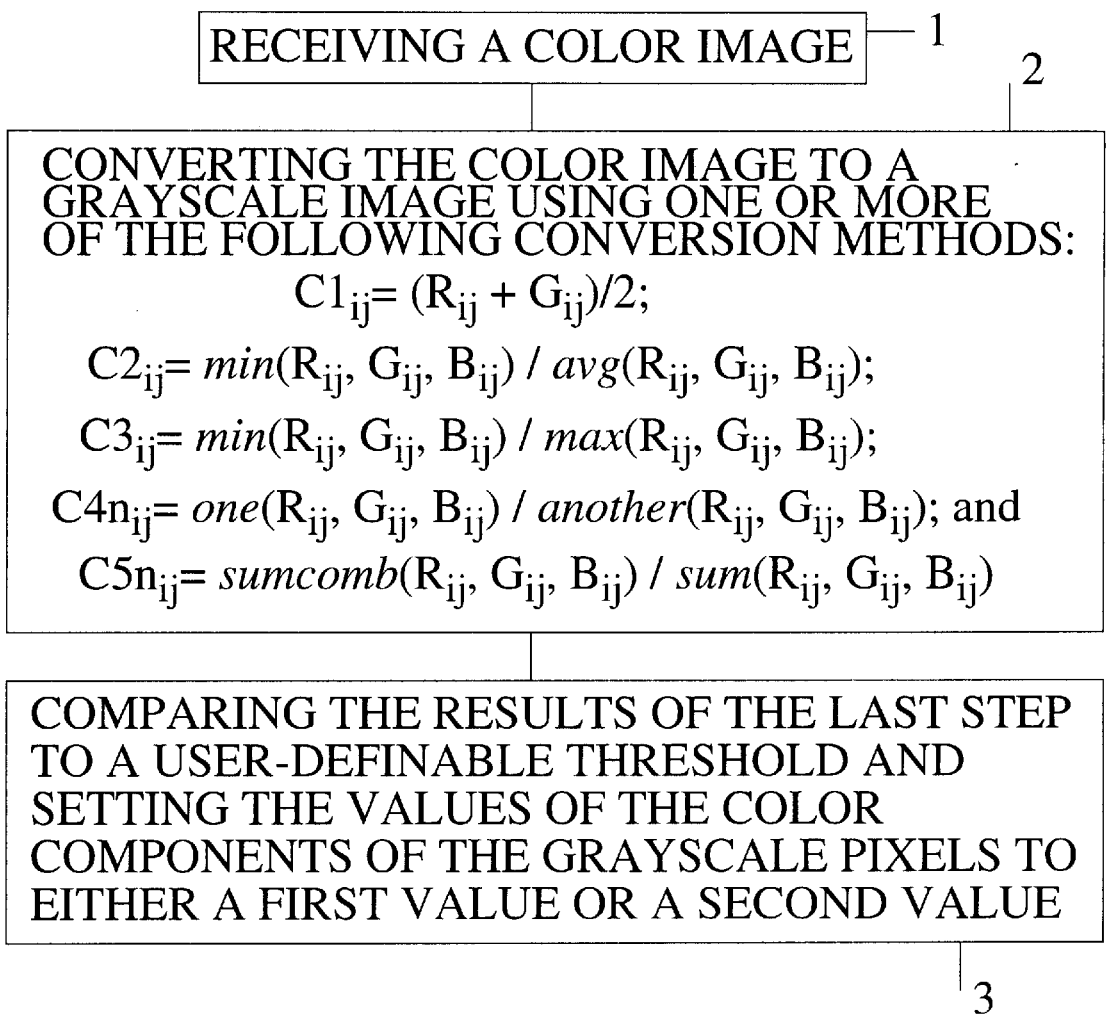
FIG. 1 is list of the steps of the method of the present invention.

The present invention is a method of extracting text from a color image. FIG. 1 is a list of the steps of the present method.

The first step 1 is receiving a color image, where the image includes pixels, where each pixel is represented by a color component system selected from the group of color component systems consisting of RGB, YIQ, CMY, XYZ, Lab, Luv, HSB, HSV, HSI, and HLS. Other color component systems unknown to the inventor or subsequently developed may also be employed in the present invention. Since RGB is used the most today, the present invention will be described in terms of RGB. However, any example in RGB may be converted to another color component system, and vice versa. In the best mode of the present invention, the image is a color image that includes text, where the text is integrated with a graphic. However, the image may also be one that includes text and a graphic, where the text and graphic are in separate regions. It appears that the prior art is able to extract text from an image that includes a graphic when the text and graphic are in separate regions, but not when the text and graphic are in the same region. The present invention works well in both cases.

The second step 2 is converting the color image received into a grayscale image in a manner that maximizes the contrast between any text in the image and the rest of the image. The second step 2 is accomplished by converting the color image received by one to five conversion methods (i.e., C1, C2, C3, C4n, and C5n) described below.

The first conversion method C1 is converting the received image to a single grayscale image by setting each of the values of the color components (i.e., R, G, and B) of each pixel in the grayscale image to the average of the red and green color component values of its corresponding pixel in the received image. That is, $$C1_{ij} = avg(R_{ij}, G_{ij}) = (R_{ij} + G_{ij})/2,$$

where $C1_{ij}$ is the value of each of the color components of pixel ij in the grayscale image (i.e., the color component values R, G, and B of pixel ij in the grayscale image are each set to $C1_{ij}$), where i is row-index in two-dimensions, where j is a column-index in two dimensions, where avg is a function that returns the average of the values within the parens, where $R_{ij}$ is the value of the red color component of corresponding pixel ij in the received image, and where $G_{ij}$ is the value of the green color component of corresponding pixel ij in the received image. For example, if pixel ij in the received image has color component values $R_{ij}=10$, $G_{ij}=31$, and $B_{ij}=90$ then the color component values R, G, and B of pixel ij in the grayscale image will each be set to (10+31)/2=20.5. Note that the present invention may use a binary value of any length to represent the pixel color component values. The greater the number of bits used to represent a color component value the greater the precision specified by the particular shade of the color in question. C1 is used to convert the received image pixel by pixel to a single grayscale image to maximize the contrast between any text in the received image and the rest of the received image. C1 works very well on images where light-color text appears against a background of a darker color.

If it is known that the received image includes light-color text against a darker color background then only C1 need be performed on the received image. If the color scheme used in the received image is unknown then C1, C2, C3, C4n, C5n, or any combination thereof may be performed on the received image.

The second conversion method C2 is converting the received image to a single grayscale image by setting each of the values of the color components (i.e., R, G, and B) of each pixel in the grayscale image to the result of dividing the minimum value of the three color component values of its corresponding pixel in the received image by the average of the color component values of its corresponding pixel in the received image. That is, $$C2_{ij} = min(R_{ij}, G_{ij}, B_{ij})/avg(R_{ij}, G_{ij}, B_{ij}),$$

where min is a function that returns the minimum of the values within the parens, and where avg is a function that returns the average of the values within the parens. For example, if pixel ij in the received image has color component values $R_{ij}=10$, $G_{ij}=31$, and $B_{ij}=90$ then R, G, and B in pixel ij in the grayscale image will each be set to (10/43.67)= 0.229. C2 is used to convert the received image pixel by pixel to a single grayscale image to maximize the contrast between any text in the received image and the rest of the received image. C2 works very well on images where color text appears against a background having a color that is light, uniform, or mixed.

If it is known that the received image includes text appearing against a background having a color that is light, uniform, or mixed then either C2, C3, C5n, or any combination thereof may be performed on the received image. If the color scheme used in the received image is unknown then C1, C2, C3, C4n, C5n, or any combination thereof may be performed on the received image.

The third conversion method C3 is converting the received image to a grayscale image by setting each of the values of the color components (i.e., R, G, and B) of each pixel in the grayscale image to the result of dividing the minimum value of the three color component values of its corresponding pixel in the received image by the maximum of the color component values of its corresponding pixel in the received image. That is, $$C3_{ij}=\min(R_{ij}, G_{ij}, B_{ij})/\max(R_{ij}, G_{ij}, B_{ij}),$$

where max is a function that returns the maximum of the values within the parens. For example, if pixel ij in the received image has color component values $R_{ij}=10$, $G_{ij}=31$, and $B_{ij}=90$ then the R, G, and B color component values in pixel ij in the grayscale image will each be set to 10/90=0.111. C3 is used to convert the received image pixel by pixel to a single grayscale image to maximize the contrast between any text in the received image and the rest of the received image. C3 works very well on images where color text appears against a background having a color that is light, uniform, or mixed.

If it is known that the received image includes text appearing against a background having a color that is a light, uniform, or mixed then C3, C2, C5n, or any combination thereof may be performed on the received image. If the color scheme used in the received image is unknown then C1, C2, C3, C4n, C5n, or any combination thereof may be performed on the received image.

The fourth conversion method C4n is converting the received image to a number of different grayscale images by setting each of the values of the color components (i.e., R, G, and B) of each pixel in one of the grayscale images to the result of dividing one of the values of the color components of the corresponding pixel in the received image by another one of the values of the color components of the corresponding pixel in the received image. That is:

$$C4n_{ij}=\text{one}(R_{ij}, G_{ij}, B_{ij})/\text{another}(R_{ij}, G_{ij}, B_{ij}), \text{ where } n=1, 2, 3, 4, 5, \text{ and } 6,$$

where one is a function that returns one of the values within the parens, and where another is a function that returns one of the values within the parens that is of a different color component type than was returned by the function one. The number of grayscale images returned by C4n is equal to the number of unique combinations possible for C4n. For RGB, having three color components, six grayscale images are returned as follows:

$$C41_{ij}=R_{ij}/G_{ij};$$

$$C42_{ij}=R_{ij}/B_{ij};$$

$$C43_{ij}=G_{ij}/R_{ij};$$

$$C44_{ij}=G_{ij}/B_{ij};$$

$$C45_{ij}=B_{ij}/R_{ij}; \text{ and}$$

$$C46_{ij}=B_{ij}/G_{ij}.$$

In a color system having four color components per pixel, C4n would return twelve grayscale images. If pixel ij in the received image has color component values $R_{ij}=10$, $G_{ij}=31$, and $B_{ij}=90$ then $C41_{ij}=(10/31)=0.322$; $C42_{ij}=(10/90)=0.111$; $C43_{ij}=(31/10)=3.1$; $C44_{ij}=(31/90)=0.344$; $C45_{ij}=(90/10)=9.0$; and $C46_{ij}=(90/31)=2.903$. C4n is used to convert the received image pixel by pixel to maximize the contrast between any text in the received image and the rest of the received image. C4n works very well on images where color text appears against a uniformly-colored background of a different color than the text.

If it is known that the received image includes color text against a uniformly-colored background of a different color than C4n, C5n (which also works very well on this type of image), or any combination thereof may be performed on the received image. If the color scheme used in the received image is unknown then C1, C2, C3, C4n, C5n, or any combination thereof may be performed on the received image.

The fifth conversion method C5n is converting the received image to a number of different grayscale images by setting each of the values of the color components (i.e., R, G, and B) of each pixel in one of the grayscale images to the result of dividing a sum of a combination of less than all of the values of the color components of the corresponding pixel in the received image by the sum of all of the values of the color components of the corresponding pixel in the received image. That is:

$$C5n_{ij}=\text{sumcomb}(R_{ij}, G_{ij}, B_{ij})/\text{sum}(R_{ij}, G_{ij}, B_{ij}), \text{ where } n=1, 2, 3, 4, 5, \text{ and } 6,$$

where sumcomb is a function that returns a sum of a combination of less than all of the values within the parens, and where sum is a function that returns the sum of the values within the parens. The number of grayscale images returned by C5n is equal to the number of unique combinations possible for C5n. For RGB, having three color components, six grayscale images are returned as follows:

$$C51_{ij}=R_{ij}/(R_{ij}+G_{ij}+B_{ij});$$

$$C52_{ij}=G_{ij}/(R_{ij}+G_{ij}+B_{ij});$$

$$C53_{ij}=B_{ij}/(R_{ij}+G_{ij}+B_{ij});$$

$$C54_{ij}=(R_{ij}+G_{ij})/(R_{ij}+G_{ij}+B_{ij});$$

$$C55_{ij}=(R_{ij}+B_{ij})/(R_{ij}+G_{ij}+B_{ij}); \text{ and}$$

$$C56_{ij}=(G_{ij}+B_{ij})/(R_{ij}+G_{ij}+B_{ij}).$$

In a color system having four color components per pixel, C5n would return fourteen grayscale images. If pixel ij in the received image has color component values $R_{ij}=10$, $G_{ij}=31$, and $B_{ij}=90$ then $C51_{ij}=(10/131)=0.076$; $C52_{ij}=(31/131)=0.237$; $C53_{ij}=(90/131)=0.687$; $C54_{ij}=(41/131)=0.313$; $C55_{ij}=(100/131)=0.763$; and $C56_{ij}=(121/131)=0.924$. C5n is used to image pixel by pixel to maximize the contrast between any text in the received image and the rest of the received image. C5n works very well on images where color text appears against a background having a color that is light, uniform, or mixed or where color text appears against a uniformly-colored background of a different color than the text.

If it is known that the received image includes color text against a uniformly-colored background of a different color than C4n, C5n (which also works very well on this type of image), or any combination thereof may be performed on the received image. If the color scheme used in the received image is unknown then C1, C2, C3, C4n, C5n, or any combination thereof may be performed on the received image.

Conversion steps C1, C2, C3, C4n, C5n, produce, in general, non-integer valued images (i.e. floating point). The following expression converts a floating point pixels value to an integer value as follows:

$$Cmn_{ij} = floor\left\{\frac{(2^k - 1)[Cmn_{ij} - \min(allpixels)]}{\max(allpixels) - \min(allpixels)}\right\}$$

where k is a user-definable bit-length of the resulting integer, where allpixels is the group of all of the floating point pixels values in the converted image, where min is a function that returns the minimum of the values within the parens, where max is a function that returns the maximum of the values within the parens, and where floor is a function that returns an integer that is nearest to but not greater than the result of the term within the brackets. For example, if a converted image C is a matrix of size 2×2 with entries $C_{11}$=0.234, $C_{12}$=0.567, $C_{21}$=0.753, and $C_{22}$32 1.274, then the integer values for these pixels to be represented by 8 bits are as follows:

$C_{11}$=floor(255(0.234−0.234)/(1.274−0.234))=0;

$C_{12}$=floor(255(0.567−0.234)/(1.274−0.234))=81;

$C_{21}$=floor(255(0.753−0.234)/(1.274−0.234))=127; and $C_{22}$=floor(255(1.274−0.234)/(1.274−0.234))=255.

Some image processors accept both floating point values and integer values while others accept only one type of value.

The third step 3 is comparing, for each grayscale image resulting from the second step 2, the value of a color component of a pixel in the grayscale image to a user-definable threshold T, where T is defined for each grayscale image, and setting the values of the color components of the pixel to a first value (e.g., 0) if the value of the color component of the pixel in the grayscale image is not greater than T and setting the values of the color components of the pixel to a second value (e.g., 1) if the value of the color component of the pixel in the grayscale image is greater than T. The first and second value may be such that the grayscale image in converted to a binary image where any text in the received image appears as either black text against a white background or white text against a black background. The threshold is defined for each grayscale image as follows:

T=min(all pixels in the grayscale image)+k*std(all pixels in the grayscale image), where k is a positive integer, and where std is a function that returns the standard deviation of the values within the parens. In an alternate embodiment, T may be defined as follows:

T=max(all pixels in the grayscale image)−k*std(all pixels in the grayscale image).

From empirical data, setting k=2 produces a very good value for either definition of T, while setting k=1 produces a good value for either definition of T. The result of the third step 3 is a set of binary images (i.e., black text on a white background or vice versa). The result of the third step 3 may be processed further by an optical character reader or a search engine.

What is claimed is:

1. A method of extracting text from a color image, comprising the steps of:
   a) receiving a color image, where the image includes pixels, where each pixel is represented by a color component system;
   b) converting the color image received to at least one grayscale image using a conversion method selected from the group of conversion methods consisting of the following:

$C1_{ij}$=avg($R_{ij}$, $G_{ij}$), $C2_{ij}$=avg($R_{ij}$, $G_{ij}$, $B_{ij}$)/avg($R_{ij}$, $G_{ij}$, $B_{ij}$), $C3_{ij}$=min($R_{ij}$, $G_{ij}$, $B_{ij}$)/max($R_{ij}$, $G_{ij}$, $B_{ij}$), $C4n_{ij}$=one($R_{ij}$, $G_{ij}$, $B_{ij}$)/another($R_{ij}$, $G_{ij}$, $B_{ij}$), $C5n_{ij}$=sumcomb($R_{ij}$, $G_{ij}$, $B_{ij}$)/sum($R_{ij}$, $G_{ij}$, $B_{ij}$), and any combination thereof, where $Cmn_{ij}$ is the value of each color component of a pixel ij in the at least one grayscale image, where avg returns an average, where $R_{ij}$ is a value of a red color component of a corresponding pixel ij in the received image, where $G_{ij}$ is a value of a green color component of the corresponding pixel ij in the received image, where $B_{ij}$ is a value of a blue color component of the corresponding pixel ij in the received image, where min returns a minimum, where max returns a maximum, where one returns one value, where another returns a value other than the one returned by one, where sumcomb returns a sum of less than all values, where sum returns a sum, and where n=1, 2, 3, 4, 5, and 6,; and
   c) comparing, for each pixel in the at least one grayscale image resulting from step (b), the color component value of the pixel in the at least one grayscale image to a user-definable threshold T and setting the pixel in the at least one grayscale image to a first value if the color component value of the pixel in the at least one grayscale image is not greater than T, otherwise setting the pixel in the at least one grayscale image to a second value.

2. The method of claim 1, wherein said step of receiving a color image further includes the step of selecting a color component system from the group of color component systems consisting of RGB, YIQ, CMY, XYZ, Lab, Luv, HSB, HSV, HSI, and HLS.

3. The method of claim 1, further including the step of converting each resulting value of step (b) to an integer value as follows:

$$Cmn_{ij} = floor\left\{\frac{(2^k - 1)[Cmn_{ij} - \min(allpixels)]}{\max(allpixels) - \min(allpixels)}\right\}$$

where k is a user-definable bit-length of each resulting integer, where allpixels is a group of all of the color component values for the corresponding converted color image, where min is a function that returns a minimum, where max is a function that returns a maximum, and where floor is a function that returns an integer that is nearest to but not greater than a given decimal value.

4. The method of claim 1, wherein said step of comparing, for each pixel in the at least one grayscale image resulting from step (b), the color component value of the pixel in the at least one grayscale image to a user-definable threshold T is comprised of the step of setting T as follows:

T=min(all pixels in the grayscale image)+k*std(all pixels in the grayscale image), where k is a positive integer, and where std returns a standard deviation.

5. The method of claim 4, wherein said step of comparing, for each pixel in the at least one grayscale image resulting from step (b), the color component value of the pixel in the at least one grayscale image to a user-definable threshold T is comprised of the step of setting T as follows:

T=min(all pixels in the grayscale image)+2*std(all pixels in the grayscale image).

6. The method of claim 4, wherein said step of comparing, for each pixel in the at least one grayscale image resulting from step (b), the color component value of the pixel in the at least one grayscale image to a user-definable threshold T is comprised of the step of setting T as follows:

T=min(all pixels in the grayscale image)+1*std(all pixels in the grayscale image).

7. The method of claim 1, wherein said step of comparing, for each pixel in the at least one grayscale image resulting from step (b), the color component value of the pixel in the at least one grayscale image to a user-definable threshold T is comprised of the step of setting T as follows:

T=max(all pixels in the grayscale image)−k*std(all pixels in the grayscale image), where k is a positive integer, and where std returns a standard deviation.

8. The method of claim 7, wherein said step of comparing, for each pixel in the at least one grayscale image resulting from step (b), the color component value of the pixel in the at least one grayscale image to a user-definable threshold T is comprised of the step of setting T as follows:

T=max(all pixels in the grayscale image)−2*std(all pixels in the grayscale image).

9. The method of claim 7, wherein said step of comparing, for each pixel in the at least one grayscale image resulting from step (b), the color component value of the pixel in the at least one grayscale image to a user-definable threshold T is comprised of the step of setting T as follows:

T=max(all pixels in the grayscale image)−1*std(all pixels in the grayscale image).

10. The method of claim 2, further including the step of converting each resulting value of step (b) to an integer value as follows:

$$Cmn_{ij} = floor\left\{ \frac{(2^k - 1)[Cmn_{ij} - \min(allpixels)]}{\max(allpixels) - \min(allpixels)} \right\}$$

where k is a user-definable bit-length of each resulting integer, where allpixels is a group of all of the color component values for the corresponding converted color image, where min is a function that returns a minimum, where max is a function that returns a maximum, and where floor is a function that returns an integer that is nearest to but not greater than a given decimal value.

11. The method of claim 10, wherein said step of comparing, for each pixel in the at least one grayscale image resulting from step (b), the color component value of the pixel in the at least one grayscale image to a user-definable threshold T is comprised of the step of setting T as follows:

T=min(all pixels in the grayscale image)+k*std(all pixels in the grayscale image), where k is a positive integer, and where std returns a standard deviation.

12. The method of claim 11, wherein said step of comparing, for each pixel in the at least one grayscale image resulting from step (b), the color component value of the pixel in the at least one grayscale image to a user-definable threshold T is comprised of the step of setting T as follows:

T=min(all pixels in the grayscale image)+2*std(all pixels in the grayscale image).

13. The method of claim 11, wherein said step of comparing, for each pixel in the at least one grayscale image resulting from step (b), the color component value of the pixel in the at least one grayscale image to a user-definable threshold T is comprised of the step of setting T as follows:

T=min(all pixels in the grayscale image)+1*std(all pixels in the grayscale image).

14. The method of claim 10, wherein said step of comparing, for each pixel in the at least one grayscale image resulting from step (b), the color component value of the pixel in the at least one grayscale image to a user-definable threshold T is comprised of the step of setting T as follows:

T=max(all pixels in the grayscale image)−k*std(all pixels in the grayscale image), where k is a positive integer, and where std returns a standard deviation.

15. The method of claim 14, wherein said step of comparing, for each pixel in the at least one grayscale image resulting from step (b), the color component value of the pixel in the at least one grayscale image to a user-definable threshold T is comprised of the step of setting T as follows:

T=max(all pixels in the grayscale image)−2*std(all pixels in the grayscale image).

16. The method of claim 14, wherein said step of comparing, for each pixel in the at least one grayscale image resulting from step (b), the color component value of the pixel in the at least one grayscale image to a user-definable threshold T is comprised of the step of setting T as follows:

T=max(all pixels in the grayscale image)−1*std(all pixels in the grayscale image).

* * * * *